United States Patent
Tsou et al.

(10) Patent No.: US 8,094,249 B2
(45) Date of Patent: Jan. 10, 2012

(54) ACTIVE DEVICE ARRAY SUBSTRATE HAVING BRIDGE LINES ELECTRICALLY CONNECTING SECONDARY AND MAIN DATA LINES LOCATED ON THE SAME SIDE OF A PIXEL REGION AND LIQUID CRYSTAL DISPLAY PANEL AND DRIVING METHOD THEREOF

(75) Inventors: Yuan-Hsin Tsou, Kaohsiung County (TW); Chien-Kuo He, Taipei County (TW); Meng-Feng Hung, Changhua County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 541 days.

(21) Appl. No.: 12/233,613

(22) Filed: Sep. 19, 2008

(65) Prior Publication Data

US 2010/0002156 A1  Jan. 7, 2010

(30) Foreign Application Priority Data

Jul. 2, 2008 (TW) .............................. 97124914 A (51) Int. Cl.
*G02F 1/1343* (2006.01)
*G02F 1/133* (2006.01)
*G09G 3/36* (2006.01)

(52) U.S. Cl. ............... 349/33; 349/39; 345/92; 345/103
(58) Field of Classification Search ................... 349/33, 349/143–144, 38, 39, 139; 345/90, 92, 98–100, 345/103
See application file for complete search history.

(56) References Cited

U.S. PATENT DOCUMENTS

| | | | |
|---|---|---|---|
| 6,697,109 B1 | 2/2004 | Daly | |
| 6,809,719 B2 | 10/2004 | Wu et al. | |
| 2004/0263499 A1 * | 12/2004 | Tanada et al. | 345/204 |
| 2007/0030233 A1 | 2/2007 | Chai et al. | |

* cited by examiner

*Primary Examiner* — Uyen Chau N Le
*Assistant Examiner* — Michael Mooney
(74) *Attorney, Agent, or Firm* — Jianq Chyun IP Office (57) ABSTRACT

An active device array substrate includes a number of scan lines, a number of data lines perpendicular to the scan lines, and a number of pixel regions. Each of the pixel regions includes a number of pixel sets arranged along a direction of the data lines. Each of the pixel sets has a number of adjacent pixels arranged along the direction of the data lines. The pixels in each of the pixel sets are electrically connected to the same data line. Each of the scan lines is separately arranged between the pixels. The data lines corresponding to the same pixel region are adjacent to one another and arranged at the same side of the pixel region.

23 Claims, 4 Drawing Sheets

ACTIVE DEVICE ARRAY SUBSTRATE HAVING BRIDGE LINES ELECTRICALLY CONNECTING SECONDARY AND MAIN DATA LINES LOCATED ON THE SAME SIDE OF A PIXEL REGION AND LIQUID CRYSTAL DISPLAY PANEL AND DRIVING METHOD THEREOF

CROSS-REFERENCE TO RELATED APPLICATION

This application claims the priority benefit of Taiwan application serial no. 97124914, filed on Jul. 2, 2008. The entirety of the above-mentioned patent application is hereby incorporated by reference herein and made a part of this specification.

BACKGROUND OF THE INVENTION

1. Field of the Invention

The present invention relates to a substrate and a display panel. More particularly, the present invention relates to an active device array substrate, a liquid crystal display (LCD) panel having the active device array substrate, and a driving method of the LCD panel.

2. Description of Related Art

In recent years, an optoelectronic technology and a semiconductor device manufacturing technology become more mature, and therefore flat panel displays have been prosperously developed. Among the flat panel displays, an LCD is widely adopted to gradually replace a conventional CRT display and has become a main stream of displays in the market due to the advantages of a low operation voltage, non-radiation, light weight, small volume occupancy, and so forth.

The LCD mainly includes an LCD panel and a backlight module. The backlight module provides a planar light source (a white light source in most cases) for the LCD panel, such that the LCD is able to perform a gray-scale display function.

In terms of color performance of the LCD, a color filter layer is usually applied in the LCD panel for mixing color light beams of the backlight module, so as to display color images. For instance, in a thin-film transistor liquid crystal display (TFT-LCD), the color filter layer corresponding to each pixel is usually composed of a plurality of color photoresists. The color photoresists include red color photoresists, green color photoresists, and blue color photoresists. A dimension of each of the color photoresists and a distance among the color photoresists are not able to be recognized by human eyes. Hence, a color image comprising a mixture of different colors (red, green and blue) of visible light beams can be displayed on the LCD. Nevertheless, a light transmittance rate is reduced after the light beams pass through the color photoresists of the color filter layer, and thus the LCD has insufficient luminance.

To resolve said issue, a plurality of solutions have been proposed according to the related art. One of the solutions aims at using a light emitting diode (LED) as the light source in the backlight module. The LED is able to supply the LCD panel with the red light, the green light, and the blue light, respectively, and different colors of lights can be obtained by controlling the light transmittance rates of the light beams with different colors. Thereafter, gray scale data values of the lights with different colors are adjusted, so as to allow the LCD to display a full color image and enhance the luminance.

In detail, the aforesaid LCD must divide the time of displaying the full color image into the time of displaying the red color image, the time of displaying the green color image, and the time of displaying the blue color image. For instance, as a display frequency of the LCD reaches 60 Hz, an operational frequency of the red color image, the green color image, and the blue color image is 180 Hz, respectively. In other words, as the full color image is displayed on the LCD at 60 frames per second (during a frame time of 1/60 second), a sub-frame time of the red image, the green image, and the blue image is 1/180 second, respectively. By rapidly switching the red frame, the green frame, and the blue frame, the entire full color image can be displayed within the original frame time of the LCD. A method for rapidly switching the red image, the green image, and the blue image on an axis of time within a range of time of visual retention to form the full color image is referred to as a field color sequential (FCS) method.

By applying said FCS method, the fabrication of the color filter layer in the LCD can be omitted, and the luminance of the LCD can then be enhanced. However, when the FCS method is applied, the frame time of the LCD is reduced to one third of the original frame time. Namely, a charging time of each of the pixels is reduced to one third of the original charging time, such that display errors are more likely to occur in the LCD due to the insufficient charging time of the pixels and the insufficient response time of corresponding liquid crystals.

Figure 1:
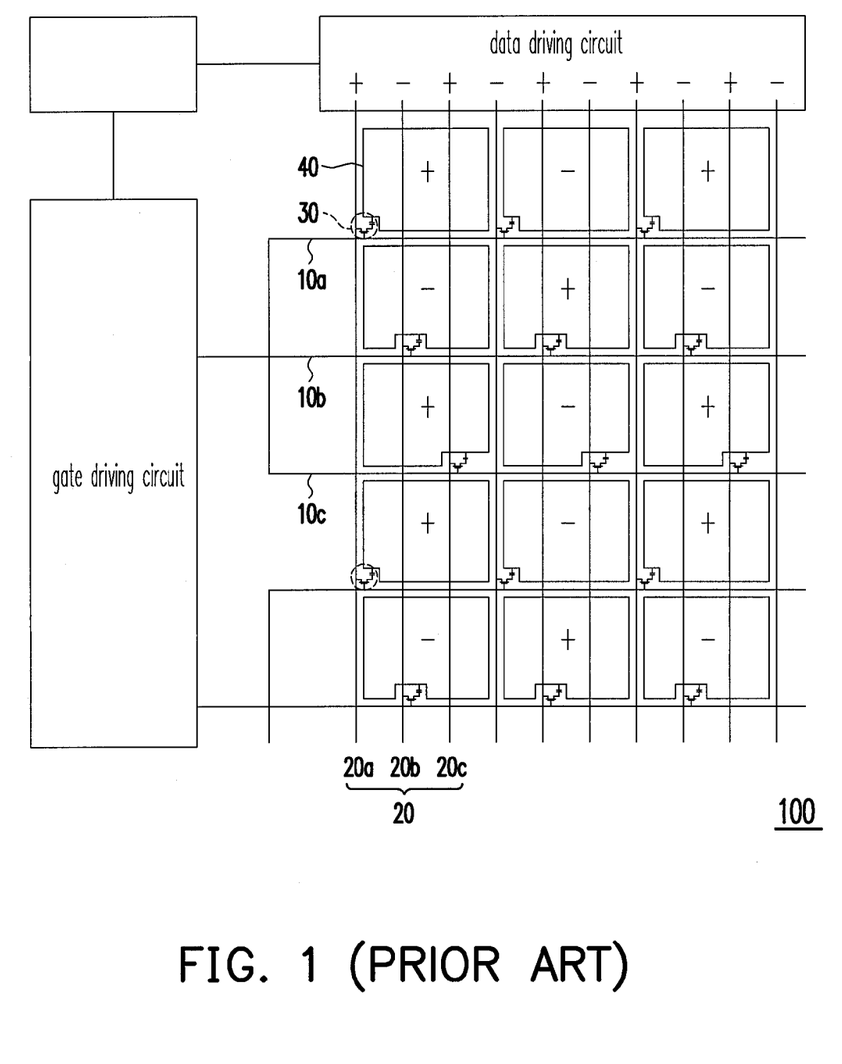
FIG. 1 is a schematic view of a conventional active device array substrate.

To resolve said issue regarding the short response time of the LCD, a plurality of solutions have been proposed according to the related art. One of the solutions is directed to an application of a specific type of liquid crystals having a relatively fast response speed, such as optically compensated bend (OCB) liquid crystals. Nonetheless, the specific type of liquid crystals brings about an increase in costs of manufacturing the LCD.

in U.S. Patent Application Publication No. 2007/0030233, a method for driving an active device array substrate sequentially is disclosed for enhancing a response speed of an LCD. In detail, please refer to FIG. 1 which is a schematic view of the active device array substrate as proposed in the U.S. Patent Application Publication No. 2007/0030233. In FIG. 1, an active device array substrate 100 includes a plurality of scan lines 10, a plurality of data lines 20, a plurality of pixel electrodes 40, and a plurality of active devices 30 for controlling each of the pixel electrodes 40. Each of the pixel electrodes 40 is electrically connected to the corresponding scan line 10 and the corresponding data line 20. In the method of sequentially driving the active device array substrate 100, a plurality of scan lines 10a, 10b, and 10c are required to be turned on at the same time, and different data voltages must be input to the different pixel electrodes 40 through a plurality of data lines 20a, 20b, and 20c simultaneously. To avoid the erroneous input of the data voltages, the plurality of data lines 20a, 20b, and 20c should be arranged within the pixel electrodes 40. Namely, the data lines 20a, 20b, and 20c pass through the pixel electrodes 40 arranged in the same column, such that the data lines 20a, 20b, and 20c are disposed below the pixel electrodes 40 in the same column. Nevertheless, said orientation easily results in occurrence of a coupling effect between the pixel electrodes 40 and the data lines 20 and occurrence of a cross-talk effect, thus negatively affecting the display quality of the LCD. On the other hand, when a number of the data lines are arranged within the pixels, an aperture ratio of the LCD is apt to be decreased.

SUMMARY OF THE INVENTION

The present invention is directed to an active device array substrate capable of increasing a response time of each pixel.

The present invention is further directed to an LCD panel characterized by an enhanced luminance and an improved display quality.

The present invention is further directed a method for driving the aforesaid LCD panel. A response time of the LCD panel driven by conducting said method can be increased when an FCS method is applied.

The present invention provides an active device array substrate including a plurality of scan lines, a plurality of data lines perpendicular to the scan lines, and a plurality of pixel regions. Each of the pixel regions includes a plurality of pixel sets arranged along a direction of the data lines. Each of the pixel sets has a plurality of adjacent pixels arranged along the direction of the data lines. The pixels in each of the pixel sets are electrically connected to the same data line. Each of the scan lines is separately arranged between the pixels. The data lines corresponding to the same pixel region are adjacent to one another and arranged at the same side of the same pixel region.

In one embodiment of the present invention, the pixel sets in each of the pixel regions include a first pixel set, a second pixel set, and a third pixel set. The second pixel set is positioned between the first pixel set and the third pixel set. In one embodiment of the present invention, the data lines corresponding to each of the pixel regions include a first data line, a second data line, and a third data line. The first data line, the second data line, and the third data line are electrically connected to the first pixel set, the second pixel set, and the third pixel set, respectively. In another embodiment of the present invention, the first data line corresponding to each of the pixel regions is disposed between the first pixel set and the second data line, and the second data line is disposed between the second pixel set and the third data line.

In one embodiment of the present invention, the data line corresponding to each of the pixel sets has a main line and a plurality of source connection lines, and the data line is electrically connected to the pixels through the source connection lines, respectively. Here, the length of the main lines is increased along with an increase in the minimum distance from the main lines to the corresponding pixels. In one embodiment of the present invention, at least one of the data lines corresponding to each of the pixel regions further includes a secondary line and a bridge line. The secondary line is parallel to the main line and is disposed between the main line and the corresponding pixel set. Through the bridge line, the secondary line is connected to the main line in parallel. Here, the main line, the bridge line, the secondary line, and the source connection lines are arranged along a signal transmitting direction of the data line. In another embodiment of the present invention, the secondary line is disposed in an extending direction of the adjacent data lines. Here, the secondary line includes a plurality of conductive line segments parallel to one another, and the bridge line also includes a plurality of conductive line segments parallel to one another.

In one embodiment of the present invention, each of the pixels includes a pixel electrode and an active device. The active device is electrically connected to the pixel electrode, the corresponding scan line, and the corresponding data line. In one embodiment of the present invention, the pixel electrodes are not overlapped with the data lines. In another embodiment of the present invention, each of the pixels further includes a common electrode. The common electrode and each of the pixel electrodes together form a storage capacitor.

In one embodiment of the present invention, the pixels in each of the pixel regions are substantially aligned to one another along the direction of the data lines.

The invention further provides an LCD panel including an active device array substrate, an opposite substrate, and a liquid crystal layer. The active device array substrate includes a plurality of scan lines, a plurality of data lines perpendicular to the scan lines, and a plurality of pixel regions. Each of the pixel regions includes a first pixel set, a second pixel set, and a third pixel set. The first pixel set includes a plurality of first pixels electrically connected to the corresponding scan lines and a first data line among the data lines. The second pixel set includes a plurality of second pixels electrically connected to the corresponding scan lines and a second data line among the data lines. The third pixel set includes a plurality of third pixels electrically connected to the corresponding scan lines and a third data line among the data lines. The first pixels, the second pixels, and the third pixels in each of the pixel regions are arranged along a direction of the data lines. Besides, the first data line, the second data line, and the third data line corresponding to the same pixel region are adjacent to one another and disposed at the same side of the same pixel region. The scan lines corresponding to each of the pixel regions are separately disposed among the first pixels, among the second pixels, and among the third pixels. The liquid crystal layer is disposed between the active device array substrate and the opposite substrate.

In one embodiment of the present invention, the LCD panel has a first display region corresponding to the first pixel sets, a second display region corresponding to the second pixel sets, and a third display region corresponding to the third pixel sets. A brightness of the first pixels in an $n^{th}$ row corresponding to the first display region, a brightness of the second pixels in the $n^{th}$ row corresponding to the second display region, and a brightness of the third pixels in the $n^{th}$ row corresponding to the third display region are simultaneously changed. Here, n is greater than or equal to 1.

In one embodiment of the present invention, the length of each of the third data lines is greater than the length of each of the second data lines, and the length of each of the second data lines is greater than the length of each of the first data lines.

In one embodiment of the present invention, each of the second data lines includes a main line, a secondary line, a bridge line, and a plurality of source connection lines. The secondary line is positioned in an extending direction of the first data line and is connected to the main line in parallel through the bridge line. The source connection lines are respectively connected to the corresponding second pixels. Here, the main line, the bridge line, the secondary line, and the source connection lines are arranged along a signal transmitting direction of the second data line.

In one embodiment of the present invention, each of the third data lines includes a main line, a secondary line, a bridge line, and a plurality of source connection lines. The secondary line is positioned in an extending direction of the first data line and the second data line. Besides, the secondary line is connected to the main line in parallel through the bridge line. The source connection lines are respectively connected to the corresponding third pixels. Here, the main line, the bridge line, the secondary line, and the source connection lines are arranged along a signal transmitting direction of the third data line.

In one embodiment of the present invention, each of the first pixels, each of the second pixels, and each of the third pixels respectively include an active device and a pixel electrode. In one embodiment of the present invention, the pixel electrodes are not overlapped with the data lines. In another embodiment of the present invention, the first pixels, the second pixels, and the third pixels further include a common electrode. The common electrode and each of the pixel electrodes together form a storage capacitor.

The present invention further provides a method for driving the aforesaid LCD panel. The driving method includes sequentially turning on the scan lines corresponding to the first pixel sets, sequentially turning on the scan lines corresponding to the second pixel sets, and sequentially turning on the scan lines corresponding to the third pixel sets. Here, a method of writing data signals into each of the first pixels, each of the second pixels, and each of the third pixels includes following steps. First, first scan lines corresponding to the first pixel sets, the second pixel sets, and the third pixel sets are simultaneously turned on, so as to simultaneously input a set of the data signals into the first pixel sets in a first row, the second pixel sets in a first row, and the third pixel sets in a first row through the first data lines, the second data lines, and the third data lines. Next, the first scan lines corresponding to the first pixel sets, the second pixel sets, and the third pixel sets are simultaneously turned off. Thereafter, next scan lines corresponding to the first pixel sets, the second pixel sets, and the third pixel sets are simultaneously turned on, so as to simultaneously input another set of the data signals into the first pixel sets in a next row, the second pixel sets in a next row, and the third pixel sets in a next row through the first data lines, the second data lines, and the third data lines.

Based on the above, the active device array substrate or the LCD panel can be divided into three sub-regions performing the display function at the same time according to the orientation of the data lines and the pixels in the present invention. Thereby, the operation time assigned to each of the pixels can be increased in an effective manner. As a result, the active device array substrate or the LCD panel disclosed in the present invention can have an improved display quality when the luminance is enhanced.

To make the above and other objectives, features, and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
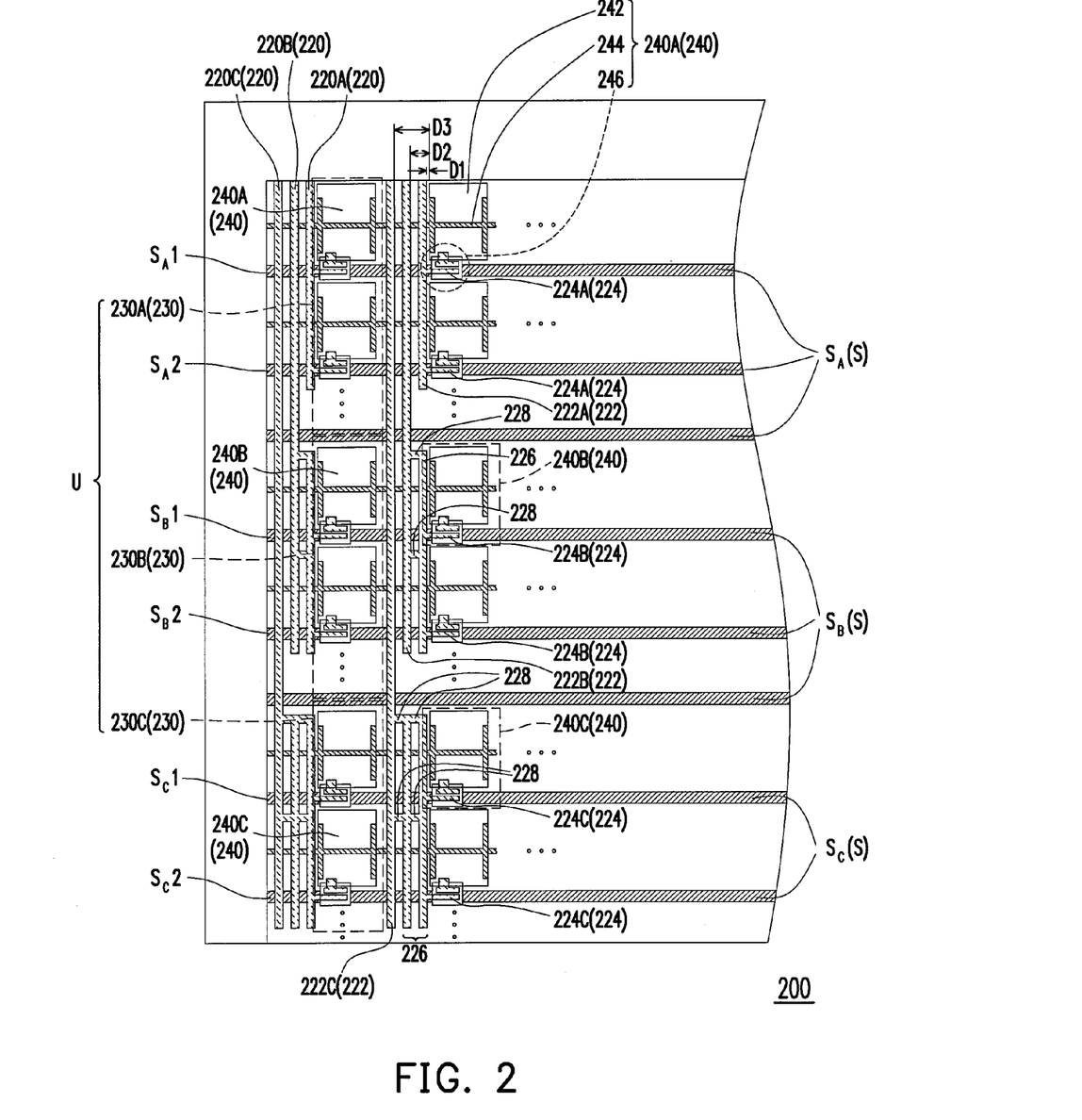
FIG. 2 is a schematic view of an active device array substrate according to the present invention.

FIG. 2 is a schematic view of an active device array substrate according to the present invention. Referring to FIG. 2, an active device array substrate 200 includes a plurality of scan lines S, a plurality of data lines 220 perpendicular to the scan lines S, and a plurality of pixel regions U. Each of the pixel regions U includes a plurality of pixel sets 230 arranged along a direction of the data lines 220. In FIG. 2, three pixel sets 230 are illustrated to exemplify the present invention. Namely, the pixel sets 230 in each of the pixel regions U include a first pixel set 230A, a second pixel set 230B, and a third pixel set 230C, for example. The second pixel set 230B is, for example, positioned between the first pixel set 230A and the third pixel set 230C.

Besides, each of the pixel sets 230 has a plurality of adjacent pixels 240 arranged along the direction of the data lines 220. In the present embodiment, the pixels 240 in each of the pixel sets 230 are substantially aligned to one another along the direction of the data lines 220. Specifically, the first pixel set 230A has a plurality of first pixels 240A, the second pixel set 230B has a plurality of second pixels 240B, and the third pixel set 230C has a plurality of third pixels 240C, for example. In other words, as indicated in FIG. 2, in the active device array substrate 200, each of the pixel regions U in the same column has a plurality of adjacent first pixels 240A, a plurality of adjacent second pixels 240B, and a plurality of adjacent third pixels 240C arranged along a direction of the data lines 220 from top to bottom.

With reference to FIG. 2, the pixels 240 in each of the pixel sets 230 are electrically connected to the same data line 220. That is to say, each of the first pixels 240A is electrically connected to the same first data line 220A, each of the second pixels 240B is electrically connected to the same second data line 220B, and each of the third pixels 240C is electrically connected to the same third data line 220C. Note that the first data line 220A, the second data line 220B, and the third data line 220C that are corresponding to each of the pixel regions U are adjacent to one another and arranged at the same side of each of the pixel regions U. Certainly, the number of the data lines 220 arranged at the same side of each of the pixel regions U should not be construed as limited to the present invention. Besides, in the present embodiment, the first data line 220A is, for example, disposed between the first pixel set 230A and the second data line 220B, and the second data line 220B is disposed between the second pixel set 230B and the third data line 220C. In addition, each of the scan lines S is separately arranged between each of the pixels 240.

It should be mentioned that each of the data lines 220 has a main line 222 and a plurality of source connection lines 224. For better illustration, the data lines 220 corresponding to the pixel regions U in a second column are depicted in FIG. 2. Each of the data lines 220 is electrically connected to each of the corresponding pixels 240 through each of the source connection lines 224, respectively. Moreover, the length of the main lines 222 of the data lines 220 corresponding to the pixel sets 230 is increased along with an increase in the minimum distance from the main lines 222 to the corresponding pixels 240. For instance, in the present embodiment, the main lines 222 of the first data line 220A, the second data line 220B, and the third data line 220C refer to a first main line 222A, a second main line 222B, and a third main line 222C, respectively. A minimum distance from the first main line 222A to the first pixel 240A is referred to as D1. A minimum distance from the second main line 222B to the second pixel 240B is referred to as D2. A minimum distance from the third main line 222C to the third pixel 240C is referred to as D3. As indicated in FIG. 2, since D1<D2<D3, the length of the first main line 222A is less than the length of the second main line 222B, and the length of the second main line 222B is less than the length of the third main line 222C. In other words, the first data line 220A, the second data line 220B, and the third data line 220C corresponding to the pixel region U have different lengths. Thereby, the second data line 220B and the third data line 220C require no cross-interconnection and are still able to be arranged outside the layout of the first data line 220A, so as to transmit data signals directly to the second pixel 240B and the third pixel 240C through the corresponding source connection lines 224. As such, the load of the data lines 220 as a whole can be reduced in the present invention.

Additionally, to further reduce the resistance of the second data line 220B and the third data line 220C, the second data line 220B and the third data line 220C respectively have a secondary line 226 and a bridge line 228 as shown in FIG. 2, for example. For instance, the secondary line 226 of the second data line 220B is parallel to the second main line 222B and is disposed between the second main line 222B and the corresponding second pixel set 230B. Besides, the secondary line 226 of the second data line 220B is connected to the second main line 222B in parallel through the bridge line 228. According to the present embodiment, the secondary line 226 is, for example, positioned in an extending direction of the adjacent first data line 220A. In the second data line 220B, the second main line 222B, the bridge line 228, the secondary line 226, and the source connection lines 224 are arranged along a signal transmitting direction of the second data line 220B. Moreover, the secondary line 226 can be a single conductive line segment as is the second data line 220B. In an alternative, the secondary line 226 can also be composed of a plurality of parallel conductive line segments as is the third data line 220C. The position where the secondary line 226 is disposed and arranged is not limited in the present invention. Furthermore, the bridge line 228 includes a plurality of conductive line segments parallel to one another, for example, which is however not limited in the present invention. Components of the third data line 220C are similar to those of the second data line 220B, and therefore no further description is provided herein.

On the other hand, each of the pixels 240 includes a pixel electrode 242 and an active device 246, and the active device 246 is electrically connected to the pixel electrode 242, the corresponding scan line S, and the corresponding data line 220. In the present embodiment, each of the pixels 240 further includes a common electrode 244, and the common electrode 244 and each of the pixel electrodes 242 together form a storage capacitor, so as to improve the display quality of the pixels 240. In FIG. 2, the first pixel 240A in the first row and in the second column serves to exemplify the present invention. Different from the related art, the present invention teaches disposing the data lines 220 at the same side of each of the pixel electrodes 242. In addition, according to the present embodiment, the pixel electrodes 242 are not overlapped with the data lines 220. Hence, the occurrence of a coupling effect between the data lines 220 and the pixel electrodes 242 can be significantly prevented. As such, when the pixels 240 perform the display function, a cross-talk effect caused by the data lines 220 can be effectively avoided, and the display quality of the pixels 240 can be improved.

Figure 3:
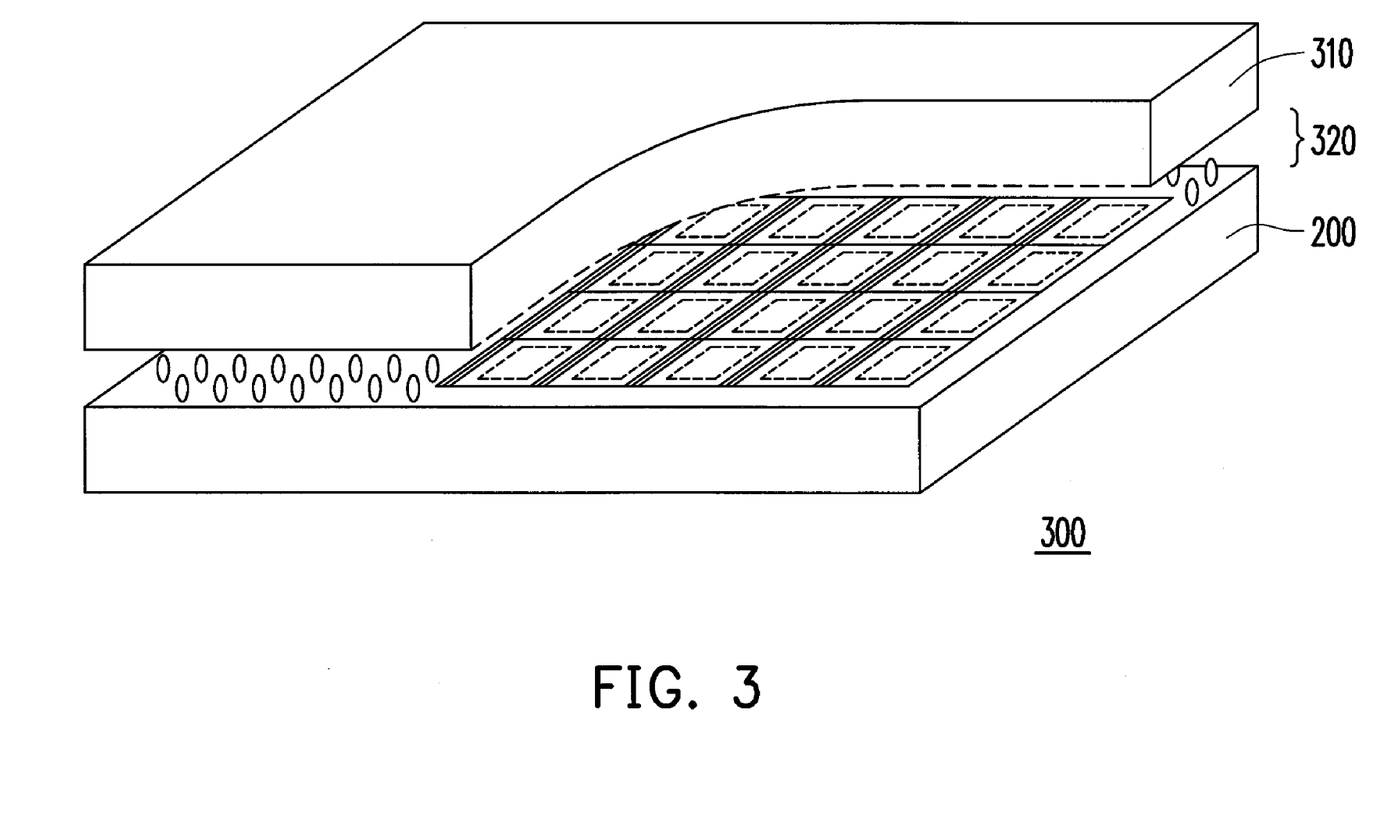
FIG. 3 is a schematic view of an LCD panel according to the present invention.

FIG. 3 is a schematic view of an LCD panel according to the present invention. Referring to FIG. 3, an LCD panel 300 includes the active device array substrate 200 as described in any of the previous embodiments, an opposite substrate 310, and a liquid crystal layer 320. Basic components of the active device array substrate 200 are similar to those depicted in FIG. 2, and therefore no further description is provided herein. The liquid crystal layer 320 is disposed between the active device array substrate 200 and the opposite substrate 310.

Figure 4:
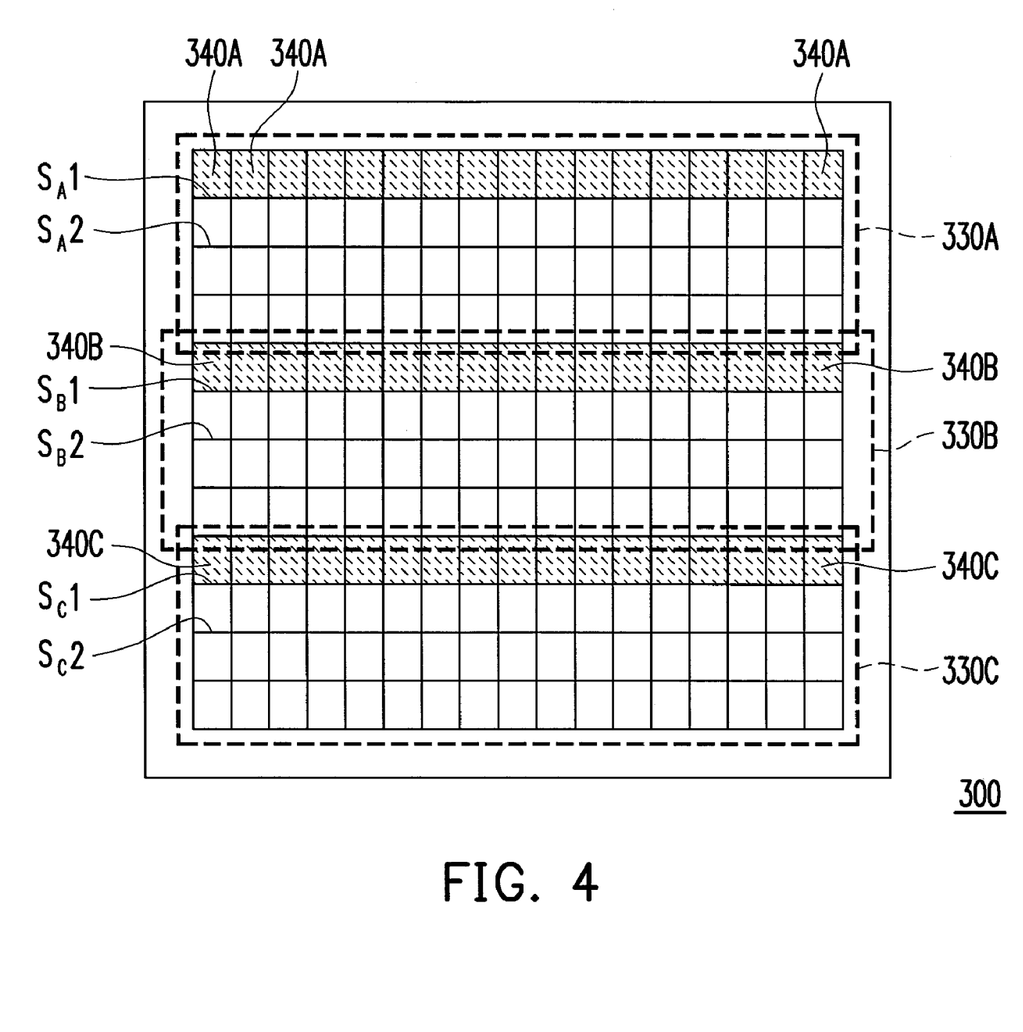
FIG. 4 is a schematic front view of the LCD panel which is depicted in FIG. 3 and is performing a display function.

FIG. 4 is a schematic front view of the LCD panel which is depicted in FIG. 3 and is performing a display function. Here, an active device array substrate of the LCD panel 300 refers to the active device array substrate 200 depicted in FIG. 2, for example. Referring to FIGS. 2 and 4, the LCD panel 300 has a first display region 330A corresponding to the first pixel sets 230A, a second display region 330B corresponding to the second pixel sets 230B, and a third display region 330C corresponding to the third pixel sets 230C. Note that a brightness of first pixels 340A in an $n^{th}$ row corresponding to the first display region 330A, a brightness of second pixels 340B in the $n^{th}$ row corresponding to the second display region 330B, and a brightness of third pixels 340C in the $n^{th}$ row corresponding to the third display region 330C are simultaneously changed. Here, n is greater than or equal to 1. As indicated in FIG. 4, the brightness of the first pixels 340A in the first row corresponding to the first display region 330A, the brightness of the second pixels 340B in the first row corresponding to the second display region 330B, and the brightness of the third pixels 340C in the first row corresponding to the third display region 330C are changed synchronically. That is to say, a display frame of the LCD panel 300 can be divided into three sub-regions that perform the display function at the same time according to the present invention. Thereby, the time of inputting the data signals into each of the pixels can be increased, and an issue regarding the insufficient response time of the conventional LCD can be resolved according to the present invention.

Since the display frame of the LCD panel 300 can be divided into three sub-regions that perform the display function at the same time, the time of writing the data signals into each of the pixels can be increased in an effective manner. For instance, as shown in FIG. 4, a voltage in an on state is simultaneously supplied to a first scan line $S_A1$ corresponding to the first display region 330A, a first scan line $S_B1$ corresponding to the second display region 330B, and a first scan line $S_C1$ corresponding to the third display region 330C, so as to input the respective data signals into the first pixels 340A in the first row in the first display region 330A, the second pixels 340B in the first row in the second display region 330B, and the third pixels 340C in the first row in the third display region 330C. Thereby, in FIG. 4, the brightness of the first pixels 340A in the first row corresponding to the first display region 330A, the brightness of the second pixels 340B in the first row corresponding to the second display region 330B, and the brightness of the third pixels 340C in the first row corresponding to the third display region 330C are changed synchronically. A method for driving the LCD panel 300 is provided below for elaborating the present invention.

Referring to FIGS. 2 and 4, the driving method includes sequentially turning on the scan lines $S_A$ corresponding to the first pixel sets 230A, sequentially turning on the scan lines $S_B$ corresponding to the second pixel sets 230B, and sequentially turning on the scan lines $S_C$ corresponding to the third pixel sets 230C. Here, the scan lines $S_A$, $S_B$, and $S_C$ are synchronically turned on. In particular, a method of writing the data signals into each of the first pixels 240A, each of the second pixels 204B, and each of the third pixels 240C includes following steps. First, first scan lines $S_A1$, $S_B1$, and $S_C1$ corresponding to the first pixel sets 230A, the second pixel sets 230B, and the third pixel sets 230C are turned on at the same time, so as to simultaneously input one set of the data signals into each of the first pixel sets 230A in the first row, each of the second pixel sets 230B in the first row, and each of the third pixel sets 230C in the first row through each of the first data lines 220A, each of the second data lines 220B, and each of the third data lines 220C.

Next, referring to FIG. 2, the first scan lines $S_A1$ corresponding to the first pixel sets 230A, the first scan lines $S_B1$ corresponding to the second pixel sets 230B, and the first scan lines $S_C1$ corresponding to the third pixel sets 230C are simultaneously turned off. After that, the next scan lines S corresponding to the first pixel sets 230A, the second pixel sets 230B, and the third pixel sets 230C are simultaneously turned on. Here, the next scan lines S are, for example, a second scan line $S_A2$ corresponding to the first pixel set 230A, a second scan line $S_B2$ corresponding to the second pixel set 230B, and a second scan line $S_C2$ corresponding to the third pixel set 230C as depicted in FIG. 2. Thereafter, another set of the data signals are simultaneously inputted into the first pixel sets 230A in the second row, the second pixel sets 230B in the second row, and the third pixel sets 230C in the second row through the first data lines 220A, the second data lines 220B, and the third data lines 220C. As such, the scan lines corresponding to the three pixel sets are turned on at the same time, and all the scan lines S in each of the pixel sets 230 are sequentially turned on (from the first scan line to the last scan line).

In the active device array substrate 200 or the LCD panel 300 of the present invention as shown in FIG. 4, the display frame of the LCD panel 300 can be divided into three sub-regions performing the display function at the same time by conducting said driving method. In other words, a sub-frame time of a red image, a sub-frame time of a green image, and a sub-frame time of a blue image in a conventional LCD panel are $1/180$ second, respectively. Namely, the scan lines of the active device array substrate must be turned on sequentially within $1/180$ second. Given that the number of the scan lines of the LCD is N, the time of turning on each of the scan lines in the conventional LCD panel is $(1/180)N$ second. By contrast, in the active device array substrate 200 or the LCD panel 300 of the present invention, the display frame can be divided into three sub-regions within the same sub-frame time. Here, the three sub-regions perform the display function at the same time, which means the time of turning on each of the scan lines is $(1/60)N$ second in the present invention. As such, the time spent on turning on the scan lines can be effectively extended according to the present invention, so as to allow each of the pixels to have a relatively long operation time. In the present invention, the FCS method can be fully utilized for overcoming the defect of the insufficient response time of each of the pixels. Thus, the LCD panel in which no color filter layer is disposed is still able to rapidly switch the sub-frames with different colors and perform the full color display function in real time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:
a plurality of scan lines;
a plurality of data lines perpendicular to the scan lines; and
a plurality of pixel regions, each of the pixel regions comprising a plurality of pixel sets arranged along a direction of the data lines, each of the pixel sets comprising a plurality of adjacent pixels arranged along the direction of the data lines, wherein the pixels in each of the pixel sets are electrically connected to the same data line, each of the scan lines is separately arranged between the pixels, and the data lines corresponding to the same pixel region are adjacent to one another and arranged at the same side of the same pixel region.

2. The active device array substrate as claimed in claim 1, wherein the pixel sets in each of the pixel regions comprise a first pixel set, a second pixel set, and a third pixel set, and the second pixel set is positioned between the first pixel set and the third pixel set.

3. The active device array substrate as claimed in claim 2, wherein the data lines corresponding to each of the pixel regions comprise a first data line, a second data line, and a third data line, and the first data line, the second data line, and the third data line are electrically connected to the first pixel set, the second pixel set, and the third pixel set, respectively.

4. The active device array substrate as claimed in claim 3, wherein the first data line corresponding to each of the pixel regions is disposed between the first pixel set and the second data line, and the second data line is disposed between the second pixel set and the third data line.

5. The active device array substrate as claimed in claim 1, wherein the data line corresponding to each of the pixel sets has a main line and a plurality of source connection lines, and the data line is electrically connected to the pixels through the source connection lines, respectively.

6. The active device array substrate as claimed in claim 5, wherein the length of the main lines is increased along with an increase in the minimum distance from the main lines to the corresponding pixels.

7. The active device array substrate as claimed in claim 5, wherein at least one of the data lines corresponding to each of the pixel regions further comprises a secondary line and a bridge line, the secondary line is parallel to the main line and is disposed between the main line and the corresponding pixel set, and through the bridge line the secondary line is connected to the main line in parallel.

8. The active device array substrate as claimed in claim 7, wherein the main line, the bridge line, the secondary line, and the source connection line are arranged along a signal transmitting direction of the data line.

9. The active device array substrate as claimed in claim 7, wherein the secondary line is disposed in an extending direction of the adjacent data lines.

10. The active device array substrate as claimed in claim 7, wherein the secondary line comprises a plurality of conductive line segments parallel to one another.

11. The active device array substrate as claimed in claim 7, wherein the bridge line comprises a plurality of conductive line segments parallel to one another.

12. The active device array substrate as claimed in claim 1, wherein each of the pixels comprises a pixel electrode and an active device, and the active device is electrically connected to the pixel electrode, the corresponding scan line, and the corresponding data line.

13. The active device array substrate as claimed in claim 12, wherein the pixel electrodes are not overlapped with the data lines.

14. The active device array substrate as claimed in claim 12, wherein each of the pixels further comprises a common electrode, and the common electrode and each of the pixel electrodes together form a storage capacitor.

15. The active device array substrate as claimed in claim 1, wherein the pixels in each of the pixel regions are substantially aligned to one another along the direction of the data lines.

16. A liquid crystal display panel, comprising:
an active device array substrate, comprising:
a plurality of scan lines;
a plurality of data lines perpendicular to the scan lines;
a plurality of pixel regions, each of the pixel regions comprising:

a first pixel set, comprising a plurality of first pixels electrically connected to the corresponding scan lines and a first data line among the data lines;

a second pixel set, comprising a plurality of second pixels electrically connected to the corresponding scan lines and a second data line among the data lines;

a third pixel set, comprising a plurality of third pixels electrically connected to the corresponding scan lines and a third data line among the data lines, wherein the first pixels, the second pixels, and the third pixels in each of the pixel regions are arranged along a direction of the data lines, the first data line, the second data line, and the third data line corresponding to the same pixel region are adjacent to one another and disposed at the same side of the same pixel region, and the scan lines corresponding to each of the pixel regions are separately disposed among the first pixels, among the second pixels, and among the third pixels;

an opposite substrate; and a liquid crystal layer, disposed between the active device array substrate and the opposite substrate, the first pixel sets corresponding to a first display region, the second pixel sets corresponding to a second display region, the third pixel sets corresponding to a third display region, wherein a brightness of the first pixels in an $n^{th}$ row corresponding to the first display region, a brightness of the second pixels in the $n^{th}$ row corresponding to the second display region, and a brightness of the third pixels in the $n^{th}$ row corresponding to the third display region are simultaneously changed, and n is greater than or equal to 1.

17. The liquid crystal display panel as claimed in claim 16, wherein the length of each of the third data lines is greater than the length of each of the second data lines, and the length of each of the second data lines is greater than the length of each of the first data lines.

18. The liquid crystal display panel as claimed in claim 16, wherein each of the second data lines comprises:

a main line;

a secondary line, positioned in an extending direction of the first data line;

a bridge line, the secondary line being connected to the main line in parallel through the bridge line; and a plurality of source connection lines, respectively connected to the corresponding second pixels, wherein the main line, the bridge line, the secondary line, and the source connection lines are arranged along a signal transmitting direction of the second data line.

19. The liquid crystal display panel as claimed in claim 16, wherein each of the third data lines comprises:

a main line;

a secondary line, positioned in an extending direction of the first data line and the second data line;

a bridge line, the secondary line being connected to the main line in parallel through the bridge line; and a plurality of source connection lines, respectively connected to the corresponding third pixels, wherein the main line, the bridge line, the secondary line, and the source connection lines are arranged along a signal transmitting direction of the third data line.

20. The liquid crystal display panel as claimed in claim 16, wherein each of the first pixels, each of the second pixels, and each of the third pixels respectively comprise an active device and a pixel electrode.

21. The liquid crystal display panel as claimed in claim 20, wherein the pixel electrodes are not overlapped with the data lines.

22. The liquid crystal display panel as claimed in claim 20, wherein the first pixels, the second pixels, and the third pixels further comprise a common electrode, and the common electrode and each of the pixel electrodes together form a storage capacitor.

23. A method for driving the liquid crystal display panel as claimed in claim 16, the method comprising:

sequentially turning on the scan lines corresponding to the first pixel sets, sequentially turning on the scan lines corresponding to the second pixel sets, and sequentially turning on the scan lines corresponding to the third pixel sets, wherein a method of writing data signals into each of the first pixels, each of the second pixels, and each of the third pixels comprises:

simultaneously turning on first scan lines corresponding to the first pixel sets, the second pixel sets, and the third pixel sets, so as to simultaneously input a set of the data signals into the first pixel sets in a first row, the second pixel sets in a first row, and the third pixel sets in a first row through the first data lines, the second data lines, and the third data lines;

simultaneously turning off the first scan lines corresponding to the first pixel sets, the second pixel sets, and the third pixel sets;

simultaneously turning on next scan lines corresponding to the first pixel sets, the second pixel sets, and the third pixel sets, so as to simultaneously input another set of the data signals into the first pixel sets in a next row, the second pixel sets in a next row, and the third pixel sets in a next row through the first data lines, the second data lines, and the third data lines.

* * * * *